US006922146B2

(12) United States Patent
Yogev et al.

(10) Patent No.: US 6,922,146 B2
(45) Date of Patent: Jul. 26, 2005

(54) RADIO FREQUENCY DATA CARRIER AND SYSTEM FOR READING DATA STORED THEREIN

(75) Inventors: Amnon Yogev, Rehovot (IL); Shlomo Dukler, Tel Aviv (IL)

(73) Assignee: Inksure RF Inc., New York, NY (US)

( * ) Notice: Subject to any disclaimer, the term of this patent is extended or adjusted under 35 U.S.C. 154(b) by 103 days.

(21) Appl. No.: 10/421,731

(22) Filed: Apr. 24, 2003

(65) Prior Publication Data

US 2004/0211840 A1 Oct. 28, 2004

(51) Int. Cl.$^7$ .............................................. G08B 13/14
(52) U.S. Cl. ............................... 340/568.2; 340/572.4; 310/313 R
(58) Field of Search ........................... 340/568.2, 572.2, 340/572.4, 572.7, 10.4, 10.41, 10.42; 235/436, 491; 310/313 R (56) References Cited

U.S. PATENT DOCUMENTS

| | | | |
|---|---|---|---|
| 5,446,447 A | * 8/1995 | Carney et al. | ........... 340/572.4 |
| 5,574,470 A | 11/1996 | de Vall | |
| 5,604,485 A | * 2/1997 | Lauro et al. | ............. 340/572.5 |
| 5,625,341 A | 4/1997 | Giles et al. | |
| 5,680,106 A | * 10/1997 | Schrott et al. | ........... 340/10.33 |
| 6,788,204 B1 | * 9/2004 | Ianelli et al. | ............. 340/572.1 |
| 5,682,143 A | 10/1997 | Brady et al. | |
| 5,691,698 A | * 11/1997 | Scholl et al. | ............. 340/572.5 |
| 5,995,006 A | 11/1999 | Walsh | |
| 6,100,804 A | 8/2000 | Brady et al. | |
| 6,104,311 A | * 8/2000 | Lastinger | .................. 340/10.51 |

(Continued)

FOREIGN PATENT DOCUMENTS

DE 100 52 689 5/2002

OTHER PUBLICATIONS

"Active and Passive RFID", Savi Technology, White Paper, Jan. 2002, pp. 1–11.

ExpressTrak™ Chipless RFID "Increase consumer convenience with ExpressTrak™ Chipless RFID", Checkpoint Systems, Inc., 2002, http://www.checkpointsystems.com/downloads/pdf/es105.pdf.

ExpressTrak™ Chipless RFID, "Enhance POS operations with ExpressTrak™ Chipless RFID", Checkpoint Systems Inc., 2002, http://www.checkpointsystems.com/downloads/pdf/es102.pdf.

Vincett et al., "Electrical and Photoelectrical Transport Properties of Langmuir–Blodgett Films and a Discussion of Possible Device Applications", Thin Solid Films, 68 (1980), pp. 135–171.

*Primary Examiner*—John Tweel, Jr.
(74) *Attorney, Agent, or Firm*—Oliff & Berridge, PLC (57) ABSTRACT

A radio frequency (RF) data carrier and method and system for reading information stored in the data carrier are presented. The data carrier comprises a collection of circuitries defining together a predetermined information code. Each circuitry includes: (a) a code circuit configured to have a certain RF frequency response to a powering signal and thus defining a certain symbol of the predetermined information code, and (b) a delay circuit configured to provide a phase delay of a predetermined value to said powering signal associated with the respective code circuit to thereby define a location of this symbol in the information code. The data carrier further comprises a power unit operable to produce said powering signal to actuate the delay circuit. The power unit comprises at least one inductance coil responsive to alternation of an external magnetic field for generating said powering signal as an electromotive force voltage as a result of intersecting windings of the coil with magnetic flux lines of the external magnetic field.

22 Claims, 4 Drawing Sheets

U.S. PATENT DOCUMENTS

| | | |
|---|---|---|
| 6,304,169 B1 | 10/2001 | Blama et al. |
| 6,346,884 B1 | 2/2002 | Uozumi et al. |
| 6,424,263 B1 | 7/2002 | Lee et al. |
| 6,441,740 B1 | 8/2002 | Brady et al. |
| 6,455,979 B2 * | 9/2002 | Reindl et al. ........... 310/313 D |
| RE37,956 E | 1/2003 | Blama |

* cited by examiner

RADIO FREQUENCY DATA CARRIER AND SYSTEM FOR READING DATA STORED THEREIN

FIELD OF THE INVENTION

This invention relates generally to electronic identification articles, and in particular to a radio frequency (RF) tag, and a system and method used for reading the tag.

BACKGROUND OF THE INVENTION

Electronic article surveillance (EAS) systems are widely used to detect the presence of small electronic labels placed on or in an article or carried by a person of interest, and can, for example, be used in retail or library environments to deter theft or other unauthorized removal of articles. In particular, EAS labels are attached to articles designated to either be purchased or borrowed, and when active, will trigger an alarm if an article is carried without authorization through interrogation zones typically located at the store or library exits.

There are many applications for when users also desire to know more information than just whether a tagged object is present. For example, very often users also want to know which tagged article is present. In this connection, information-carrying tags are widely used both for the identification of products and security purposes. These information tags are able to carry a sufficient number of bits regarding the characteristics of articles to provide useful information, such as the product's name, date of manufacture, price, and whether the product, article or person has properly passed through a check-out counter or kiosk, etc. As used herein, the terms "information carriers", "marks", "markers", "labels" and "tags" are used interchangeably and refer to the devices used to carry multi-bit data therein.

The most popular example of the information-carrying multi-bit tags is a printed optical barcode. Another known technique of electronic item identification is based on the use of a Radio Frequency (RF) tag. RF tags have been developed and are disclosed, for example, in the following publications: U.S. Pat. No. 5,574,470 to de Vall; U.S. Pat. No. 5,625,341 to Giles et al.; U.S. Pat. No. 5,682,143 to Brady et al; U.S. Pat. No. 5,995,006 to Walsh; U.S. Pat. No. 6,100,804 to Brady et al.; U.S. Pat. No. 6,104,311 to Lastinger; U.S. Pat. No. 6,304,169 to Blama et al; U.S. Pat. No. 6,346,884 to Uozumi et al; U.S. Pat. No. 6,424,263 to Lee et al; U.S. Pat. No. 6,441,740 to Brady et al. Such information carrying tags are responsive to a coded RF signal received from a base station.

Generally, RF tags can be active (i.e., utilizing an internal energy source incorporated with the tag) or passive, that function using the energy of an external interrogation signal and are dependant on energy supplied from a tag reader or an external device. The RF tag typically includes an antenna attached to a resonance circuit, which is energized (e.g., by the received interrogation signal) and which, when energized, excites the antenna to transmit an RF response signal at a resonance frequency of the circuit. The antennas used in an RF ID tag are generally constituted by loops of wire or metal etched or plated on the tag surface.

The particulars and advantageous features of active and passive RF tags are described for example in the article, "*Active and Passive RFID*", Savi Technology, White paper, January 2002.

RF ID tags may have various code or memory configurations. The most simple is the single code tag typically utilized in EAS systems. These tags emit a single response when activated by a reader. The response is a simple "yes" or "no" indicating whether or not the tag is present or activated. Other tags respond with a code including a preset serial number. It is also known to provide a plurality of resonant circuits on an RF ID tag, each resonant circuit configured with the tag to output a response signal at a predetermined frequency in response to an interrogating signal. The response signals define a response code of the tag, which is determined by the number of individual circuits and the manner of their operation.

For example, U.S. Pat. No. 6,104,311 to Lastinger describes an RF identification tag comprising a substrate, an input mechanism disposed on the substrate and configured to receive a query signal, and an output mechanism disposed on the substrate. The tag includes a response circuitry disposed on the substrate in operative communication with the input/output mechanism which can be one or more antennas configured to receive and transmit signals at a predetermined frequency. The response circuitry includes one or more code circuits, each configured to output a unique response code. A connection between any given code circuit and a given antenna determines a response code and frequency at which that response code will be generated and output in the response signal. The selective connection of the code circuits and the antennas determines the response code/frequency combinations that comprise the response signal.

Another technique described in U.S. Pat. No. 6,304,169 to Blama utilizes radio frequency waves transmission between a scanning device and an RF tag in order to identify an item to which the tag is attached. The tag includes a first insulating layer having a top surface and a bottom surface, and resonant circuits formed on the first insulating layer. Each of the resonant circuits is formed on one of the top and bottom surfaces of the first insulating layer, and has a resonant frequency associated therewith. Each of the code circuits includes a code circuit (capacitance and inductance elements). The tag is associated with a binary number established by a pattern of ones and zeros depending on each circuit resonance or non-resonance, respectively.

The developments in the RF tag technology are aimed at creating the so-called chipless RFID tags (utilizing a printing technique rather than the integrated technology), such as disclosed, for example, in the following Internet Sites:

http://www.checkpointsystems.com/downloads/pdf/es105.pdf http://www.checkpointsystems.com/downloads/pdf/es102.pdf

SUMMARY OF THE INVENTION

Thus, there is a need in the art for, and it would be useful to have, an RF data carrier capable of carrying a multi-bit information code, and a method and system for reading in this tag.

The main idea of the invention consists of providing an RF tag formed with a plurality of RF elements activated by an external alternating magnetic field in accordance with a predetermined sequence to provide a unique sequence of RF responses indicative of a predetermined information code.

Thus, according to one broad aspect of the invention, there is provided a radio frequency (RF) data carrier comprising:

(a) a collection of circuitries defining together a predetermined information code, each circuitry including (a)

a code circuit configured to have a certain RF frequency response to a powering signal defining a symbol of the predetermined information code, and (b) a delay circuit configured to provide a phase delay of a predetermined value to the powering signal associated with the respective code circuit; and (b) a power unit operable to produce said powering signal to actuate the delay circuit, said power unit comprising at least one inductance coil responsive to alternation of an external magnetic field for generating said powering signal as an electromotive force voltage as a result of intersecting windings of the coil with magnetic flux lines of the external magnetic field.

Preferably, the alternation of the magnetic field has a frequency lower than an RF frequency range, e.g., 50Hz. It should be understood that, generally, the following factors have to be taken into consideration while selecting the frequency of the magnetic field. On the one hand, lowering the frequency would provide for a higher number of sequentially readable RF responses within a half-period of the powering field (i.e., the possibility of more different symbols forming the information code), and higher signal-to-noise (STN) of the detected responses. On the other hand, using a too low frequency of the magnetic field would result in too low electromotive force voltage.

The power unit and the collection of circuitries are preferably constructed from conductive material printed on a substrate. The power unit and the collection of circuitries may be incorporated into an article carrying said RF data carrier, for example by printing technique.

According to another aspect of the present invention, there is provided a system for reading data stored in at least one RF data designed as described above. The system comprises a magnetic field source for actuating the power unit of the data carrier, and a detector sensitive to the RF responses of the at least one data carrier, and is operable to produce the alternation of the magnetic field generated by the magnetic field source.

The alternation of the magnetic field can be implemented by generating an alternating magnetic field, or providing a relative displacement between the data carrier and the magnetic field source. To this end, the system may comprise a movable stage for supporting the at least one data carrier while being read.

The magnetic field source may comprise at least one pair of coils. The two coils of each pair are arranged in a spaced-apart relationship so as to be at opposite sides of a data carrier-containing site. Considering an array of the pairs of coils, they are associated with successive regions of the data carrier site, respectively, and may be sequentially operated to thereby create a gradient of the magnetic field along the data carrier containing site. The magnetic field source may also be configured to create a rotating magnetic field.

According to yet another aspect of the present invention, there is provided a power unit for use with a system for reading data stored in at least one RF data configured as described above. The power unit comprises a magnetic field source operable to create an alternating magnetic field of a predetermined frequency.

According to yet another aspect of the invention, there is provided a method of reading data stored in at least one RF data carrier configured as described above. The method comprises: producing a magnetic field of a predetermined frequency within a site containing the at least one data carrier and providing an alternation of said magnetic field so as to induce said electromotive force voltage for powering the data carrier to produce a predetermined sequence of the frequency responses; detecting the data carrier responses and generating data indicative of the information code stored in the data carrier.

The multi-bit data carrier according to the present invention may be easily and efficiently manufactured and marketed, and may have a low manufacturing cost.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The principles and operation of the information-carrying multi-symbol data carrier and identification system according to the present invention may be better understood with reference to the drawings and the accompanying description, it being understood that these drawings and examples in the description are given for illustrative purposes only and are not meant to be limiting. The same reference numerals will be utilized for identifying those components which are common in the multi-bit data carriers shown in the drawings throughout the present description of the invention.

Figure 1A:
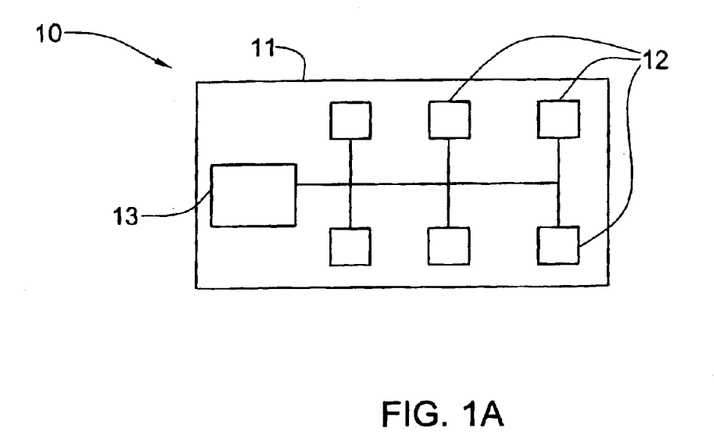
FIGS. 1A–1B illustrates a schematic plan view of a multi-bit data carrier, according to one embodiment of the invention.

Referring now to the drawings, FIG. 1A illustrates a schematic plan view of a multi-symbol data carrier 10, according to one embodiment of the invention. The data carrier 10 comprises a substrate layer 11 on which a set of circuitries 12 and a power unit 13 are printed. The relative size and position of the circuitries 12 and inductance unit 13 are shown only as a non-limiting example, and are not drawn to scale.

It should be appreciated that circuitries 12 and power unit 13 can be printed directly on the substrate layer 11, e.g. paper or plastic material, to form self-supporting carriers. Alternatively, the circuitries 12 and power unit 13 can be incorporated into the structure of an article with which the data carrier is to be associated. Thus, a data carrier may be formed in situ with the article in question by applying the circuitries 12 and power unit 13 to the surface of the article, or by embedding the circuitries 12 and power unit 13 within the body of the article.

It should be understood that a variety of printing techniques using conducting inks can be employed for printing the circuitries 12 and power unit 13. Examples of such techniques include, but are not limited to, ink jet printers, plotters, thermal transfer, letter press, offset printing, gravure printing, screen printing, etc.

The substrate layer 11 of the data carrier 10 is preferably made of a material transparent to the RF electromagnetic radiation. Examples of the material forming the substrate layer include, but are not limited to, paper, fabric and plastic, ceramic, glass or other suitable materials.

Figure 1B:
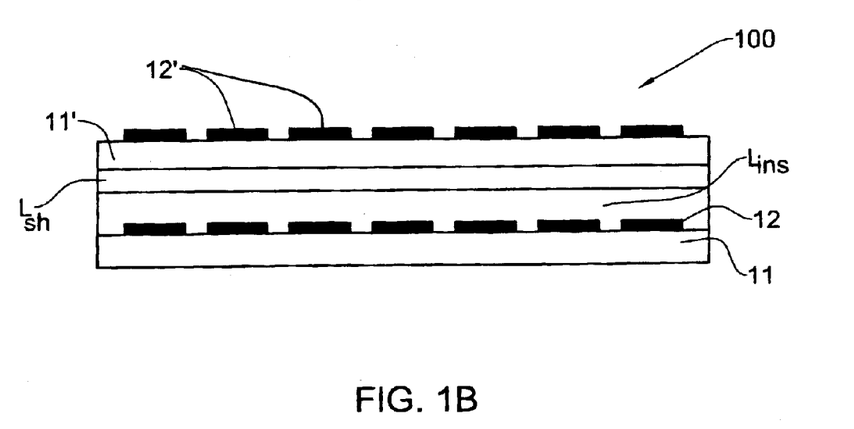

It should be appreciated that the construction of the data carrier 10 is not limited to the one layer embodiment shown in FIG. 1A. When required, a multi-layer vertical structure can be implemented by using printing techniques, in which substrate layers containing the circuitries are separated by insulating and shielding layers. This is illustrated in FIG. 1B showing a cross-sectional view of a multi-layer data carrier 100. The data carrier 100 is formed by a substrate layer 11 with a pattern of circuitries 12 on top thereof, an insulating layer $L_{ins}$ (e.g., polymer material); a shielding layer $L_{sh}$ (metal-containing material), and a further insulating layer 11' presenting a substrate for a further pattern of circuitries 12'.

Figure 2:
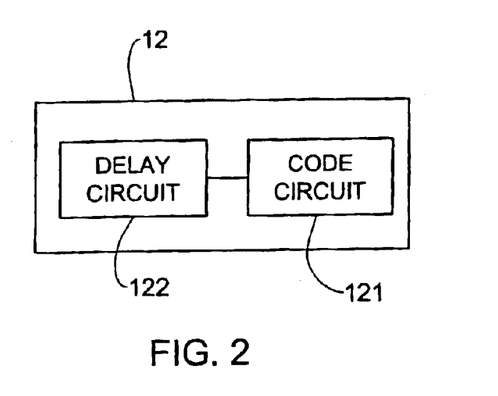
FIG. 2 illustrates a schematic view of one circuitry of the data carrier shown in FIG. 1, according to one embodiment of the invention.

Referring to FIG. 2, a schematic view of one circuitry 12 is exemplified by way of a block diagram. The circuitry 12 includes a code circuit 121 and a delay circuit 122. The code circuit 121 may be a typical RF-resonance circuit that includes capacitive, inductive and resistive elements, which may be arranged in a parallel or series electrical connection. These elements can be printed on the substrate layer 11 in a known manner by using conductive inks. Therefore, the magnitudes of the capacitive, inductive and resistive elements can be set as a part of the printing process, and are defined by a frequency representing this specific code element (symbol). The delay circuit 122 is operable to enable actuation of the respective code circuit at a predetermined moment, to thereby provide actuation of all the code circuits in a predetermined order (sequence) corresponding to the code pattern carried by all the circuits 121, as will be described more specifically further below.

The present invention provides for exciting (activating) the code circuits by an external low frequency field (as compared to the RF frequency), e.g., a 50Hz power network or less. By this, all the code circuits can be actuated with their corresponding delays while at the first half sine wave of the actuating field. This is implemented by using a magnetic field as an actuating field and designing the power unit 13 for powering the code circuits as an inductance unit responsive to the external magnetic field. This will be described further below with reference to FIGS. 7a–7d.

In general, the current resonant frequency f (in Hertz) of a tuned RLC resonance circuit can be obtained by:

$$f = \frac{1}{2\pi\sqrt{L_r C_r}}$$

where $C_r$ is capacitance (in Farads) and $L_r$ is inductance (in Henrys).

According to the invention, the code circuits (121 in FIG. 2) are configured so that the resulting response signal for each circuit is transmitted at a frequency different from those of the other circuits. The resonant frequency of the circuits 121 may be selected by defining the circuit capacitance and/or inductance. For example, the circuit capacitance can be defined by configuration of the connecting lines, while the circuit inductance can be defined by coil length, diameter, and/or turns.

A number of frequency bands (resonance frequencies) of the circuitries 121 that can be employed within a certain spectral frequency range of the data carrier 10 depends on the quality factor Q, that is a measure of the sharpness of the resonance peak of each frequency band. The quality factor Q defines the resonance condition of the code circuit: the higher the quality factor Q, the higher number of resonance frequencies can be provided within a given frequency range. Usually, the quality factor Q is defined as the resonant frequency f divided by the width at the –3 dB points $\Delta f_{3dB}$, to wit:

$$Q = \frac{f}{\Delta f_{3dB}}$$

Thus, the ability to control the magnitudes of $R_r$, $C_r$ and $L_r$, using the state of the art printers, defines the number of spectral bands that can be obtained within a spectral range of the data carrier selected for the purpose of the present invention.

According to the invention, an alphanumeric language is defined where the different frequency responses (each in the frequency range of the respective code circuit 121) define symbols, respectively, in a data marking information code ("language"). Such language, based on these symbols, is formed from "words" based on a combination of the symbols.

The number of the words (i.e., the number of possibilities to form a word) in the language depends on the length of the words, i.e. on the number of the symbols in the word. For example, the number of the words having 96 symbols (information bits) equals $2^{96}$ in the language having the binary basis (i.e. the alphabet consisting of two symbols: "0" and "1"). In other words, there are $2^{96} \approx 7.9 \times 10^{28}$ possibilities to form a word having the length of 96 symbols.

It can be understood that the same order of the number of the words, albeit having a shorter length, can be achieved by using a language having more additional symbols in its alphabet. For example, the language based on the alphabet having 22 symbols (bits) with the length of the words of 21 symbols, has the number of possibilities to form a word equal to $22^{21}$ (i.e., $\approx 1.5 \times 10^{28}$ words).

The different symbols are identifiable by different frequency responses. In order to arrange the symbols, represented by the corresponding frequency responses, in the order required in the word formed from these symbols, the code resonance circuits must differ in their time domain response. To this end, the invention employs inducing a delay between the activation of different code circuits (121 in FIG. 2), and thereby their frequency responses.

Figure 3:
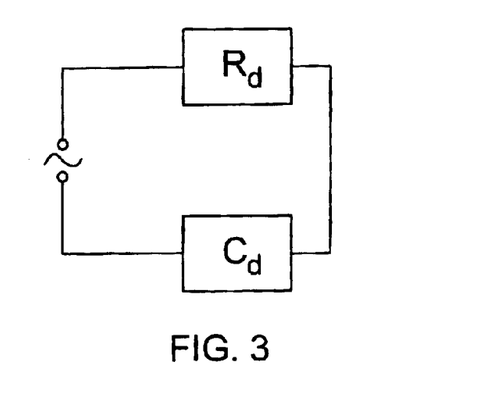
FIG. 3 illustrates an electrical scheme of the delay circuit shown in FIG. 2, according to one embodiment of the invention.

Referring to FIG. 3, an example of the delay circuit (122 in FIG. 2) is illustrated. As can be seen, the delay circuit 122 is a known RC-circuit, comprising a capacitance $C_d$ and a resistance $R_d$ that can be electrically coupled to the corresponding code circuit (121 in FIG. 2). Thus, each of the delay circuits 122 includes a resistive-capacitive coupling configured for providing a phase difference between the input voltage $e=e_0 \cos \omega t$, the voltage $U_C$ across the capacitance $C_d$ and the voltage $U_R$ across the resistance $R_d$.

As can be appreciated by a person skilled in the art, in the RC-circuit, the current I is ahead of the input voltage e. The voltage across the resistance $R_d$ is in phase with the current, while the voltage across the capacitance $C_d$ lags behind the input voltage and the current. The magnitude of the phase difference depends on the product of the value of the capacitance $C_d$ by the value of the resistance $R_d$.

Thus, the time of activation of a certain frequency response (i.e., a certain code circuit 121) may be selected by defining the circuit capacitance $C_d$ and/or resistance $R_d$ of the corresponding delay circuit 122. It should be appreciated that the magnitudes of $C_d$ and $R_d$ can be set as a part of the printing process.

Figure 4:
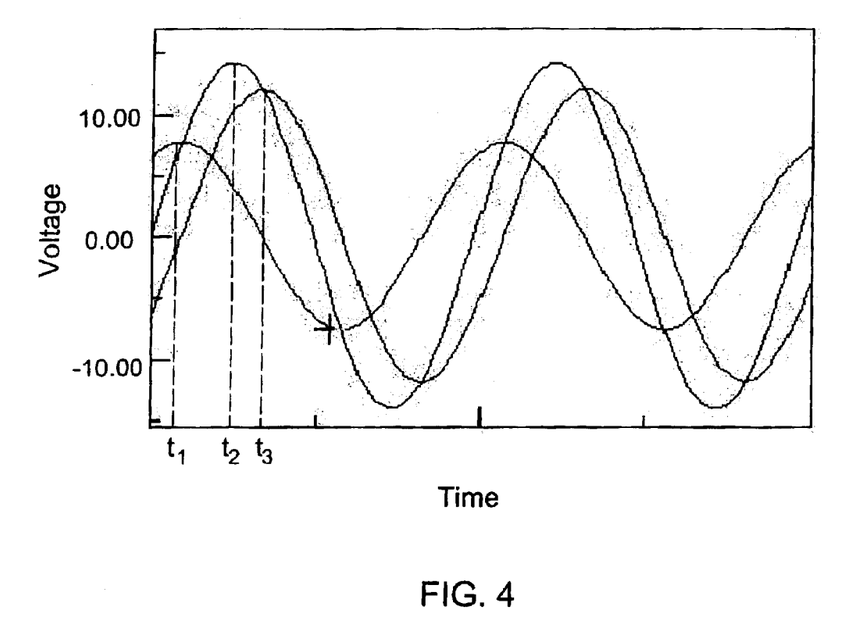
FIG. 4 illustrates a schematic diagram of exemplary waveforms of three activating voltages having a phase delay with respect to each other.

FIG. 4 illustrates a schematic diagram of exemplary waveforms of three voltages activating three different code circuits 121 of a data carrier, resulting from a phase delay produced by the corresponding delay circuits 122. As can be seen, the waveforms of the activating voltages, corresponding to these three different frequency responses, sequentially reach their maximum at times $t_1$, $t_2$ and $t_3$. At each time moment, all the code circuits 121 operate simultaneously, but can be recognized by a reader owing to both their different frequency responses and their sequential appearance. The phase behavior of the responses generated by the code circuits 121 is different, and therefore can be distinguished from each other and arranged in the order corresponding to the order of the symbols in the words.

It should be noted that the delay circuit 122 can be either directly or indirectly coupled to the corresponding resonance circuit 121 for supplying voltage thereto.

Figure 5:
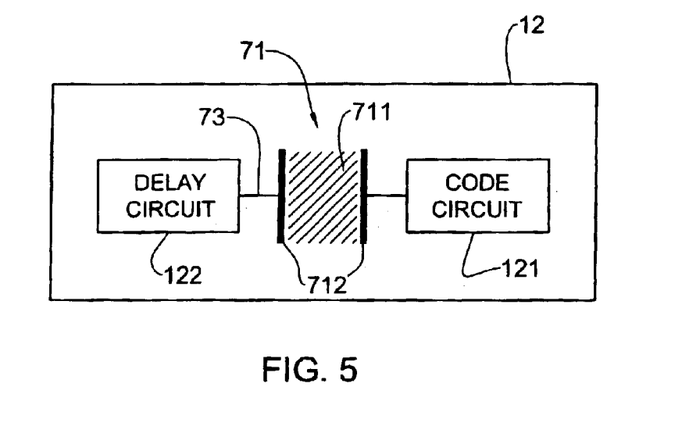
FIG. 5 illustrates a schematic view of a non-direct coupling of the delay circuit to the corresponding resonance circuit, according to one embodiment of the invention.

FIG. 5 illustrates a schematic view of the circuitry 12 in which a non-direct coupling of the delay circuit 122 to the corresponding code circuit 121 is implemented, according to one embodiment of the invention. According to this embodiment of the coupling, a tunnel switch 71 based on a monolayer is arranged between the delay circuit 122 and the code circuit 121. The operation mechanism of the tunnel switch 71 is based on a known tunneling effect whereby electrons can move instantly through a thin insulator when a voltage of a certain amplitude is applied across the insulator. For example, when a monolayer of an insulating high molecular weight material is placed between two conductors, the electrical conductivity between these two conductors depends exponentially on the electric potential difference between the conductors (see, for example, Vincett at al., *Thin Solid Films,* 1980, V 68, P. 135–171). Accordingly, the tunnel switch 71 can include a monolayer of insulating high molecular weight material 711 placed between two conductive terminals 712 arranged in a lead 73 coupling the delay circuit 122 to the code circuit 121.

Figure 6A:
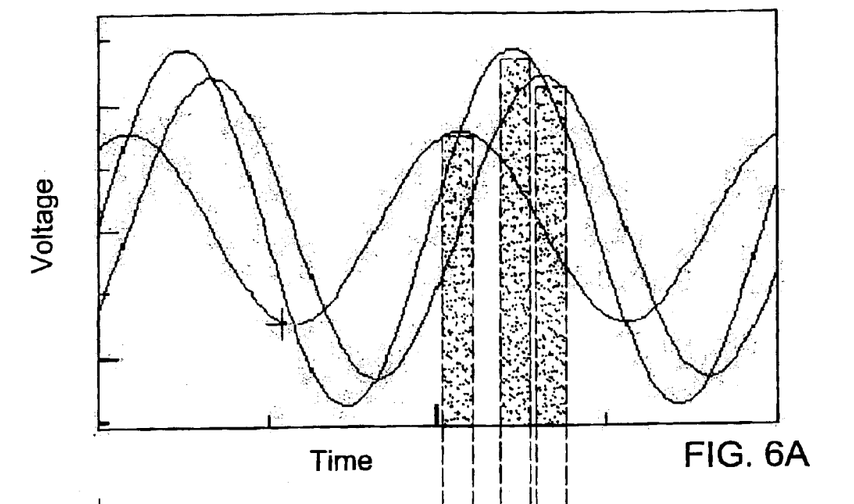
FIGS. 6A and 6B illustrate schematic diagrams of waveforms of activating voltages for activating three code circuits, according to one embodiment of the invention.
Figure 6B:
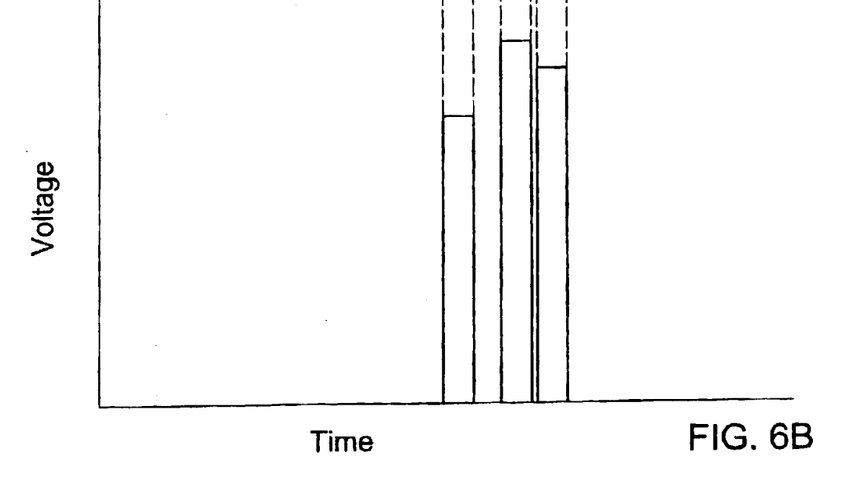

Referring to FIGS. 6A–6B, exemplary schematic diagrams of waveforms of activating voltages for activating three code circuits 121 are illustrated. FIG. 6B illustrates three pulses of the activating voltages obtained from the three waveforms shown in FIG. 6A by the tunnel switches 71 arranged downstream of the corresponding delay circuits 122. The fact that these three pulses are separated in time from each other implies that more definite time difference of the responses of the code circuits 121 can be obtained.

It should be appreciated that the tunnel switch 71 can operate also as a delay device.

Another property of the tunnel switch 71 is based on the fact that after it is subjected to a certain high voltage, it suffers electric breakdown and becomes always conductive. This process is irreversible, and the property can be utilized for the tags that require to be activated only once.

The power unit (13 in FIG. 1A) can include at least one coil printed on or incorporated in the substrate layer 11. The invention utilizes the property of the inductance coil to generate electromotive force (e.m.f.) for externally powering a data carrier. The generating of the e.m.f. is based on the principle of magnetic induction developed by Michael Faraday (1791–1867). According to Faraday's law, a magnitude e of the e.m.f. induced in the windings of the coil $L_i$ by a changing magnetic flux is determined by the equation $$e = -N \frac{d\Phi}{dt},$$

where N is the number of coil turns and $\Phi$ is the magnetic flux. Stated another way, the voltage induced in the coil equals the number of coil turns times the time rate of change of the magnetic flux linking the coils, and its polarity is opposite of the flux gradient.

The power unit 13 may alternatively be a resonance circuit. In this case, the power unit is preferably operated at a frequency different from that of the power network and its harmonics.

Referring to FIGS. 7A–7D, various examples of activation systems (magnetic field source) according to the invention for creating the changing magnetic flux $$\frac{d\Phi}{dt}$$

required for activating the data carrier (10 in FIG. 1A or 100 in FIG. 1B) are illustrated. In the example shown in FIG. 7A, a fixed magnetic assembly 111 of permanent magnet(s) is arranged in a place enclosing the route S of the data carrier movement in between the opposite poles of the magnet(s). The permanent magnet(s) can be replaced by one or more DC electromagnet. It should be understood that the vehicle (e.g., shopping cart) movement with a certain speed with respect to the magnetic field source can be implemented by providing a data carrier supporting stage driven for movement with respect to the magnetic field source along a data carrier containing site enclosed in between the magnets (i.e., within the magnetic field region). As the power unit (13 in FIG. 1A) cuts across magnetic lines of the flux $\Phi$, varying e.m.f. is generated in the coil of the power unit thus causing powering of the circuitries 12.

Figure 7A:
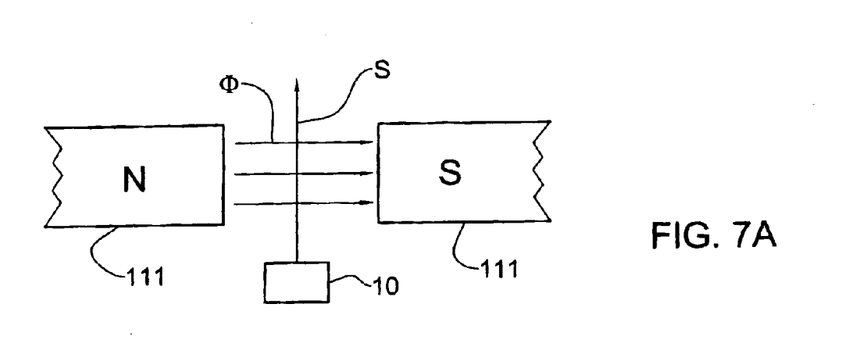
FIGS. 7A–7D illustrates various examples of systems for creating a changing magnetic flux, according to the invention.

The amount of e.m.f. voltage generated depends on (i) the strength of the magnetic field, (ii) the angle at which the coil cuts the magnetic field, (iii) the speed at which the data carrier is moved, and (iv) the area occupied by the coil within the magnetic field. The polarity of the e.m.f. voltage depends on the direction of the magnetic lines of flux and the direction of movement of the coil.

Figure 7B:
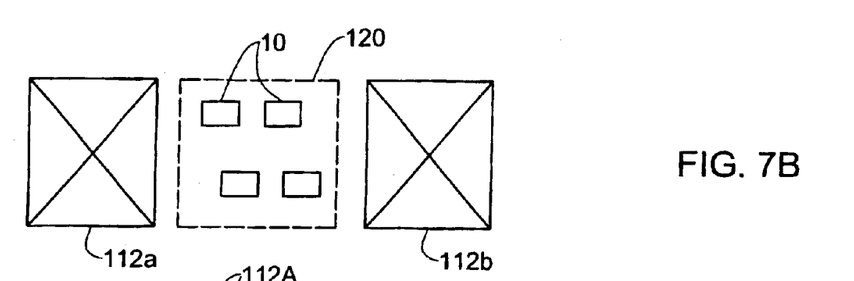
Figure 7C:
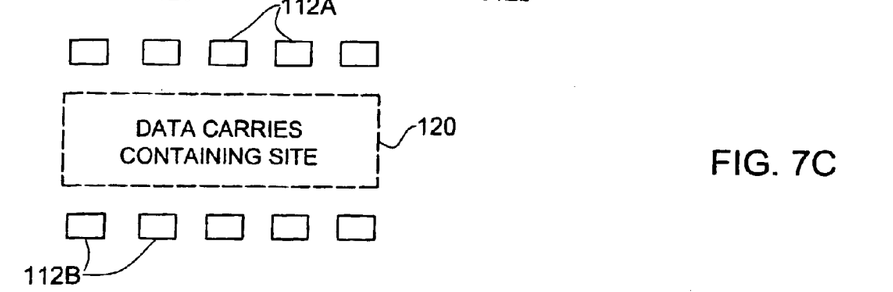
Figure 7D:
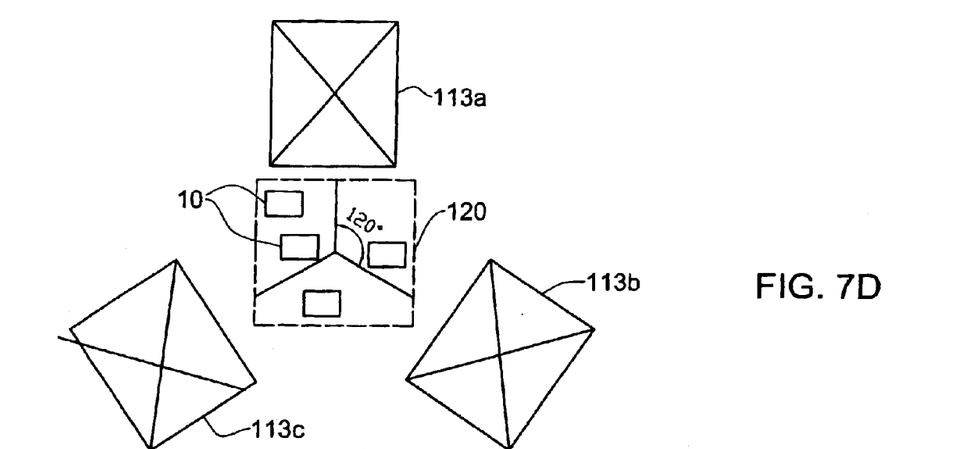

Therefore, in the applications where the data carrier is fixed or the speed at which the data carrier is moved is slow for providing a voltage having a sufficient value, the embodiments shown in FIGS. 7B, 7C and 7D can be implemented.

According to the embodiment shown in FIG. 7B, two magnetic coils 112*a* and 112*b* extend along the opposite sides of a data carriers' containing site 120. Considering a vehicle (e.g., shopping cart), the coils can either be accommodated within an exit gate of the store or be mounted on the cart itself.

When operating, the pair of the coils 112a and 112b is activated by an AC current. The coils, in turn, generate the changing magnetic flux required for generating e.m.f. in the power unit of the data carrier.

As shown in FIG. 7C, in the case when more than one data carrier must be concurrently read, a set of pairs of the coils 112a and 112b or DC electro-magnets can preferably be used. In this case, either the entire data carrying site is simultaneously irradiated by the magnetic field, or the data carrier containing site is segmented by moving the magnetic field region from segment to segment of the data carrier containing site. Thus, all the coils may be operated simultaneously, or the coil-pairs may be sequentially operated to thereby sequentially create an AC magnetic field in successive regions of the data carriers' containing site. The same can be achieved by sequentially ON/OFF switching the successive DC electro-magnets. By moving the magnetic field through the data carriers' containing site 120, the site is mapped at every moment in time by a gradient of an alternating magnetic field. Hence, the different data carriers are activated sequentially and each data carrier, after being activated, launches a sequence of RF responses corresponding to the predetermined code pattern (word).

According to the embodiment shown in FIG. 7D, a rotating magnetic field is produced within a data carrier' containing site 120 by using two or more magnets or coils—three such coils 113a–113c being shown in the present example. The rotating magnetic field can, for example, be obtained by mechanical rotation of permanent magnets or coils using a DC current. Alternatively, the rotating magnetic field can be obtained by a combination of coils in which alternating supply voltages are displaced in phases relative to each other. In particular, in the case of three-phase alternating current arrangement, three coils 113a–113c are used, being arranged at an angle of 120 degrees. There is a phase difference of $2\pi/3$ between three voltage lines corresponding to these three coils. It should be understood that in the case of a two-phase arrangement, the relative angle between the coils would be 90 degrees, and the phase difference between the supply voltages would be $\pi/2$.

Figure 8:
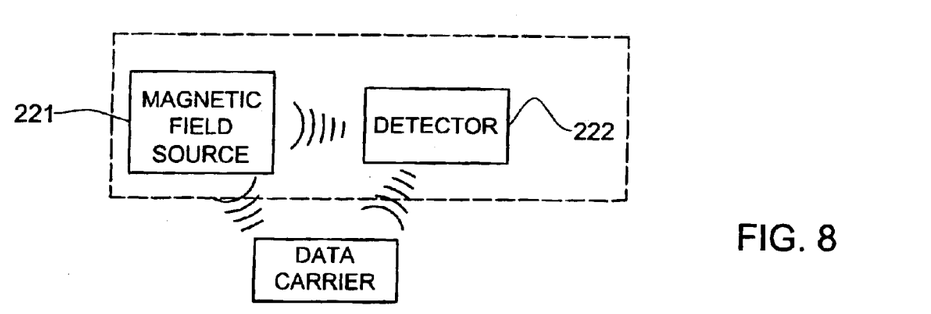
FIG. 8 illustrates a schematic view of a system for reading information stored in the data carrier of the present invention.

Another aspect of the invention involves a method and system for reading the data carrier of the present invention. FIG. 8 shows a schematic view of a system for reading information stored in the data carrier of the present invention. It should be noted that the blocks in FIG. 8 are intended as functional entities only, such that the functional relationships between the entities are shown, rather than any physical connections and/or physical relationships. The data carrier 10 (or 100 of FIG. 1B) is read by a reader arrangement formed by a magnetic field source 221 operable to actuate frequency responses of the data carrier (i.e., generated by the code circuits 121), an RF detector system 222 for detecting these responses and analyzing data indicative of the responses to identify the code pattern (word) stored in the data carrier. The detector system is composed of a single tunable resonance circuit or of an array of such circuits covering the predetermined frequency range, and operates for sensing the frequency responses of the code circuits and converting these responses into the predetermined information code, thereby determining the data stored in the data carrier. According to the present invention, the converting of the frequency responses is performed on the basis of an appropriate algorithm establishing a relationship between the frequency responses, their difference in time-domain, and symbols of the information code.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It is apparent that although the data carrier, identification system and method of reading thereof were described in terms of a multi-symbol data carrier, the invention can be easily adapted for an article surveillance label. Such label can carry only single code circuit (i.e. one bit of information), and may be utilized, for example, for detecting the presence of the labels on or in an article. The surveillance label can be used in retail or library environments to deter theft or any other unauthorized removal of articles. In particular, the labels can be attached to articles designated to either be purchased or borrowed, and will trigger an alarm if carried without authorization through interrogation zones equipped with the corresponding system for reading the label. It should also be noted that the data carrier of the present invention can actually be identified (triggered) by a reader tuned to the frequency of one of the RF circuits (code circuits) in the data carrier.

Also, it is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims and their equivalents.

What is claimed is:

1. A radio frequency (RF) data carrier comprising:
   (a) a collection of circuitries defining together a predetermined information code, each circuitry including: (a) a code circuit configured to have a certain RF frequency response to a powering signal and thus defining a certain symbol of the predetermined information code, and (b) a delay circuit configured to provide a phase delay of a predetermined value to said powering signal associated with the respective code circuit to thereby define a location of this symbol in the information code; and
   (b) a power unit operable to produce said powering signal to actuate the delay circuit, said power unit comprising at least one inductance coil responsive to alternation of an external magnetic field for generating said powering signal as an electromotive force voltage as a result of intersecting windings of the coil with magnetic flux lines of the external magnetic field.

2. The RF data carrier of claim 1 wherein said alternation of the magnetic field has a frequency lower than an RF frequency range.

3. The RF data carrier of claim 1 wherein said power unit and said collection of circuitries are constructed from conductive material printed on a substrate layer.

4. The RF data carrier of claim 1 wherein said power unit and a portion of said collection of circuitries are constructed from conductive material printed on a first substrate layer and another portion of said collection of circuitries constructed from conductive material printed on one another substrate layer, the substrate layers being separated from each other by a shielding layer made of a metal containing material.

5. The RF data carrier of claim 1 wherein said power unit and said collection of circuitries are constructed from conductive material incorporated into an article carrying said RF data carrier.

6. The RF data carrier of claim 1 wherein the circuitry further comprises a tunnel switch arranged between said delay circuit and said code circuit.

7. The RF data carrier of claim 6 wherein the tunnel switch includes a monolayer of insulating high molecular weight material placed between two conductive terminals.

8. A system for reading data stored in at least one RF data carrier of claim 1, the system comprising a magnetic field source for actuating the power unit of the data carrier, and a detector sensitive to the RF responses of the at least one data carrier, the system being operable to produce the alternation of the magnetic field generated by the magnetic field source.

9. The system of claim 8 wherein said magnetic field source includes a fixed assembly of magnets arranged in a place enclosing a route of data carriers' movement between opposite poles of the magnets.

10. The system of claim 9 wherein said magnets are permanent magnets.

11. The system of claim 8 wherein said magnets are DC electro-magnets.

12. The system of claim 8 wherein said magnetic field source includes at least two magnetic coils extended along opposite sides of a data carrier containing site, the magnetic coils being operable to generate an alternating magnetic field.

13. The system of claim 8 wherein said magnetic field source includes a set of magnetic coils extended along opposite sides of a data carrier containing site, said the entire data carrier containing site being simultaneously irradiated by magnetic field generated by the magnetic coils.

14. The system of claim 8 wherein said magnetic field source includes a set of magnetic coils extended along opposite sides of a data carrier containing site, said data carrier containing site being segmented by moving a magnetic field region generated by the magnetic coils from segment to segment of the data carrier containing site.

15. The system of claim 8 comprising a stage for supporting said at least one data carrier while being read, the stage being driven for movement with a certain speed with respect to the magnetic field source.

16. The system of claim 12 wherein said magnetic field source comprises an array of the pairs of coils arranged so as to be associated with successive regions of the data carrier containing site.

17. The system of claim 16 wherein said array of coil pairs are sequentially operated to thereby sequentially create an AC magnetic field in successive regions of the data carrier containing site.

18. The system of claim 12 wherein said magnetic field source is configured to create a rotating magnetic field.

19. A power unit for use with a system for reading data stored in at least one RF data carrier of claim 1, the power unit comprising a magnetic field source operable to create an alternating magnetic field of a predetermined frequency within a data carrier containing site.

20. A method of reading data stored in at least one RF data carrier of claim 1, the method comprising:

producing a magnetic field of a predetermined frequency within a site containing said at least one data carrier and providing an alternation of said magnetic field so as to induce said electromotive force voltage for powering the data carrier to produce a predetermined sequence of the frequency responses;

detecting the data carrier responses and generating data indicative of the information code stored in the data carrier.

21. The method of claim 20 wherein said alternation of the magnetic field is created by producing the alternating magnetic field.

22. The method of claim 20 wherein said alternation of the magnetic field is created by providing a relative displacement between the data carrier and a magnetic field source.

* * * * *